United States Patent
Spruit et al.

(10) Patent No.: US 6,549,495 B1
(45) Date of Patent: Apr. 15, 2003

(54) RECORD CARRIER, PLAYBACK DEVICE AND METHOD OF RECORDING INFORMATION

(75) Inventors: Johannes H. M. Spruit, Eindhoven (NL); Gijsbert Joseph Van Den Enden, Veldhoven (NL); Johan P. M. G. Linnartz, Eindhoven (NL); Johan C. Talstra, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/488,027

(22) Filed: Jan. 20, 2000

(30) Foreign Application Priority Data

Jan. 27, 1999 (EP) .......................................... 99200217

(51) Int. Cl.⁷ ............................................. G11B 7/007
(52) U.S. Cl. .............................. 369/47.19; 369/59.12; 369/111; 369/275.3
(58) Field of Search .................. 369/275.3, 275.4, 369/59.11, 59.12, 47.19, 53.21, 44.13, 111

(56) References Cited

U.S. PATENT DOCUMENTS

| | | | |
|---|---|---|---|
| 4,901,300 A | 2/1990 | Van Der Zande et al. | 369/47 |
| 5,187,699 A | 2/1993 | Raaymakers et al. | 369/48 |
| 5,724,327 A * | 3/1998 | Timmermans et al. | 369/48 |
| 6,128,273 A * | 10/2000 | Horie et al. | 369/275.4 |
| 6,201,773 B1 * | 3/2001 | Aoki | 369/44.13 |
| 6,208,614 B1 * | 3/2001 | Kim | 369/275.4 |

FOREIGN PATENT DOCUMENTS

| | | | |
|---|---|---|---|
| EP | 0838808 A2 | 4/1998 | |
| WO | WO9833176 | 7/1998 | G11B/7/007 |
| WO | WO9833325 | 7/1998 | H04N/7/50 |

* cited by examiner

*Primary Examiner*—W. R. Young
*Assistant Examiner*—Gautam R. Patel
(74) *Attorney, Agent, or Firm*—Michael E. Belk

(57) ABSTRACT

A record carrier has substantially parallel tracks, which exhibit first variations of a first physical parameter and second variations of a second physical parameter of the track. The first variations represent information recorded on the record carrier, which information is recoverable by means of a controllable type of data processing. A modulation pattern of the second variations represents a code for controlling the type of data processing. With respect to a code track that includes the modulation pattern, the modulation pattern in the left neighboring track is aligned to the modulation pattern in the right neighboring track. Thereby crosstalk due to the second variations in decreased, and at least two tracks have the same modulation pattern. The playback device has a demodulator and a control unit for retrieving the code from at least two tracks.

17 Claims, 5 Drawing Sheets

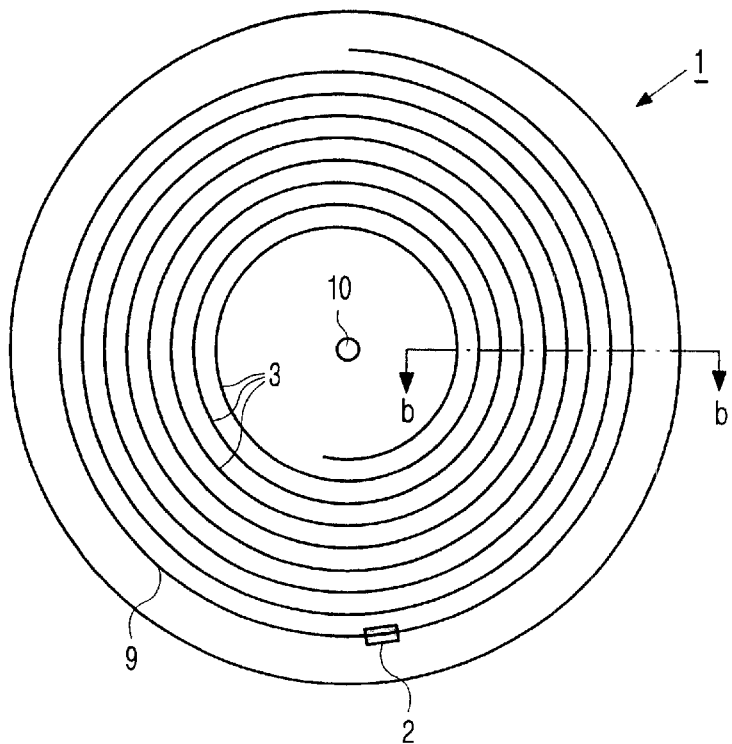
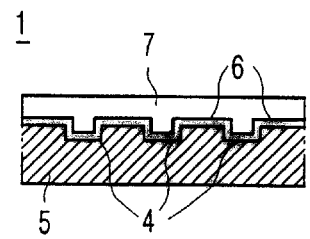
FIG. 1b
FIG. 1a
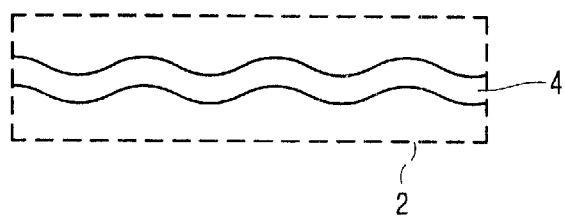
FIG. 1c
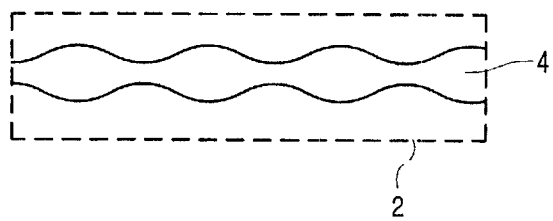
FIG. 1d

| Data bits | | | | | Sync 0 | | | | | | |
|---|---|---|---|---|---|---|---|---|---|---|---|
| Channel bits | 0 | 1 | 1 | 1 | 0 | 1 | 0 | 0 | 0 | 1 | |
| | 1 | 0 | 0 | 0 | 1 | 0 | 1 | 1 | 1 | 0 | |

| Data bits | | | | | Sync 1 | | | | | | |
|---|---|---|---|---|---|---|---|---|---|---|---|
| Channel bits | 0 | 1 | 1 | 1 | 0 | 1 | 0 | 0 | 0 | 1 | |
| | 1 | 0 | 0 | 0 | 1 | 0 | 1 | 1 | 1 | 0 | |

| Data bits | | | | | Sync 2 | | | | | | |
|---|---|---|---|---|---|---|---|---|---|---|---|
| Channel bits | 0 | 1 | 1 | 1 | 1 | 0 | 0 | 0 | 0 | 1 | |
| | 1 | 0 | 0 | 0 | 0 | 1 | 1 | 1 | 1 | 0 | |

| Data bits | | | | | Sync 3 | | | | | | |
|---|---|---|---|---|---|---|---|---|---|---|---|
| Channel bits | 0 | 1 | 1 | 1 | 0 | 0 | 1 | 0 | 0 | 1 | |
| | 1 | 0 | 0 | 0 | 1 | 1 | 0 | 1 | 1 | 0 | |

RECORD CARRIER, PLAYBACK DEVICE AND METHOD OF RECORDING INFORMATION

FIELD OF THE INVENTION

The invention relates to the field of optical disc signal encoding.

BACKGROUND OF THE INVENTION

The invention relates to a record carrier including substantially parallel tracks exhibiting first variations of a first physical parameter of the track. The first variations represent information recorded on the record carrier. The information is recoverable by means of a controllable type of data processing. The tracks also exhibit second variations of a second physical parameter of the track. A modulation pattern of the second variations represent a code for controlling the type of data processing.

The invention further relates to a method of recording information on a record carrier. The record carrier is provided with substantially parallel tracks, and the information is encoded in first variations of a first physical parameter of the track. The information is recoverable by means of a controllable type of data processing. Also, a code for controlling the type of data processing is encoded in a modulation pattern of second variations of a second physical parameter of the track.

The invention further relates to a playback device for recovering information from the record carrier. The device includes: a reader for generating a read signal depending on the first variations, a demodulator for retrieving the code from the modulation pattern of the second variations, and a data processor for processing the read signal for recovering the information depending on the code.

A system for recording information includes a record carrier, a recording method and a playback device, is known from U.S. Pat. No. 5,724,327. The record carrier includes tracks in which the information is represented in a predefined manner by optically readable marks of first variations of a first physical parameter, such as the reflectivity of the scanned surface. The track also has second variations of a second physical parameter, such as an periodic excursion of the track in a transverse direction (further denoted as wobble), a variation in depth, shape or width of the marks. The second variations are modulated and the modulation pattern represents a code which is used for recovering the information, e.g. a de-scramble code for recovering information stored as scrambled information. The code may constitute a medium mark usable in a system for copy protection, because the track wobble cannot be copied to a recordable disc on standard recording equipment. The playback device includes a reader for reading the optical marks and a demodulator for retrieving the code from the modulation of the second variations. The player and information carrier form a system for controlled information reproduction. For this purpose, the player includes a data processor for reproducing the information depending on the retrieved code. If the information is copied on a writable information carrier, the information of this copy will not be reproduced by the player, because during the copying process, only the information represented by the first variations is written to the writable information carrier. The copied information carrier does not contain the code, as the second variations cannot be produced by standard recording devices.

Those skilled in the art are directed to U.S. Pat. Nos. 4,901,300 and 5,187,699 which describe writable CD systems. Also, world patents WO98/33176 and WO98/33325 which describes codes contained in wobble of the tracks.

The above citations are hereby incorporated herein in whole by reference.

SUMMARY OF THE INVENTION

The inventors recognized that the known system described above, cannot be applied to an existing high density record carrier like DVD, because such high density record carrier systems have tight tolerances on the parameters of the track and the required modulation of a second physical parameter would disrupt the reading of the marks and cause errors in the retrieved information.

It is an object of the invention to provide a high density record carrier with a medium mark, and recording and playback apparatus for such a record carrier.

For this purpose, the record carrier as described includes a code track that comprises the modulation pattern, the modulation pattern in the left neighboring track is aligned to the modulation pattern in the right neighboring track. The code track is a track which carries in its modulation pattern the code for controlling the data processing when retrieving the recorded information. One or more (or all) tracks on the record carrier may be code tracks. The aligned modulation patterns in the tracks neighboring the code track have the effect, that second variations in the left neighboring track are complementary to second variations in the right neighboring track, because irregularities in the second variations due to the modulation are present in both neighboring tracks. Hence, any increase in disturbance caused by a second variation in the left neighboring track is compensated by a decrease in disturbance by the complementary variation in the right neighboring track. Therefore the tight tolerances on the parameters of the track can effectively be maintained and crosstalk remains limited to acceptable values.

The invention is also based on the following recognition. The amplitude of the second variations must be sufficiently strong for detecting the modulation pattern. However, in a high density record carrier, the modulation of the second variations in neighboring tracks causes crosstalk, and therefore causes noise which degrades the detection of the recorded information and detection of the modulation pattern itself. Hence, the amplitude of the second variations must be as low as possible. The inventors have recognized that, by using aligned modulation in neighboring tracks, the maximum noise contribution of the left track does not coincide with the maximum noise contribution of the right track. Hence, a relatively low amplitude of the second variations is sufficient for reliable detection of the modulation pattern. Because of the low amplitude disruption of the reading of the marks and errors in the retrieved information are minimized.

In an embodiment of the record carrier according to the invention, the second variations are displacements of the track in a direction transverse to the longitudinal direction of the track, and displacements of the left neighboring track coincide with displacements of the right neighboring track in the same direction. This has the advantage, that the crosstalk of the first variations in an adjacent tracks is reduced, because if the excursion in the one adjacent track is towards the position of a read spot on the code track and hence causes some additional crosstalk, the excursion of the other adjacent track is away from the read spot and hence causes less crosstalk.

In an embodiment of the record carrier according to the invention, the modulation patterns in the code track and the neighboring tracks represent the same code. This has the advantage, that the detection signal of the code track will be stronger because the neighboring tracks have the same modulation. Further, if the second parameter is an excursion in a transverse direction, the distance between the tracks, also called track pitch, at the modulated parts of the track still remains the same, because both tracks have the same transverse excursion. Alternatively, the modulation pattern in the code track is substantially inverse to the modulation pattern in the left neighboring track. This has the advantage for some modulation types, e.g. a wobble in a pregroove, that the detection signal of the code track is stronger.

In an embodiment of the record carrier according to the invention, the second variations are periodic and the modulation pattern includes phase modulation, and phase differences between modulation patterns in adjacent tracks are limited to a predetermined amount. Such a predetermined amount is selected to be smaller than phase differences occurring in the phase modulation. This has the advantage, that any disturbance of the neighboring tracks is substantially in phase with a read signal from the modulation pattern in the code track.

According to the invention, a code track includes the modulation pattern, the modulation pattern in the left neighboring track is aligned to the modulation pattern in the right neighboring track. The effects and advantages of the method have been explained above with reference to the record carrier.

The playback device of the invention includes a control unit for retrieving the code from at least two tracks. In the record carrier the aligned modulation patterns result in at least two tracks having the same modulation pattern and therefore representing the same code. In the playback device, the code retrieved from a first track is verified by reading a further track, which includes the same code. This has the advantage, that the retrieval of the code is more reliable.

These and other aspects of the invention will be apparent from and elucidated further with reference to the embodiments described by way of example in the following description and with reference to the accompanying drawings, in which

BRIEF DESCRIPTION OF THE DRAWING

FIG. 1 shows a record carrier,

DETAILED DESCRIPTION OF THE PREFERRED EMBODIMENT

Figure 2:
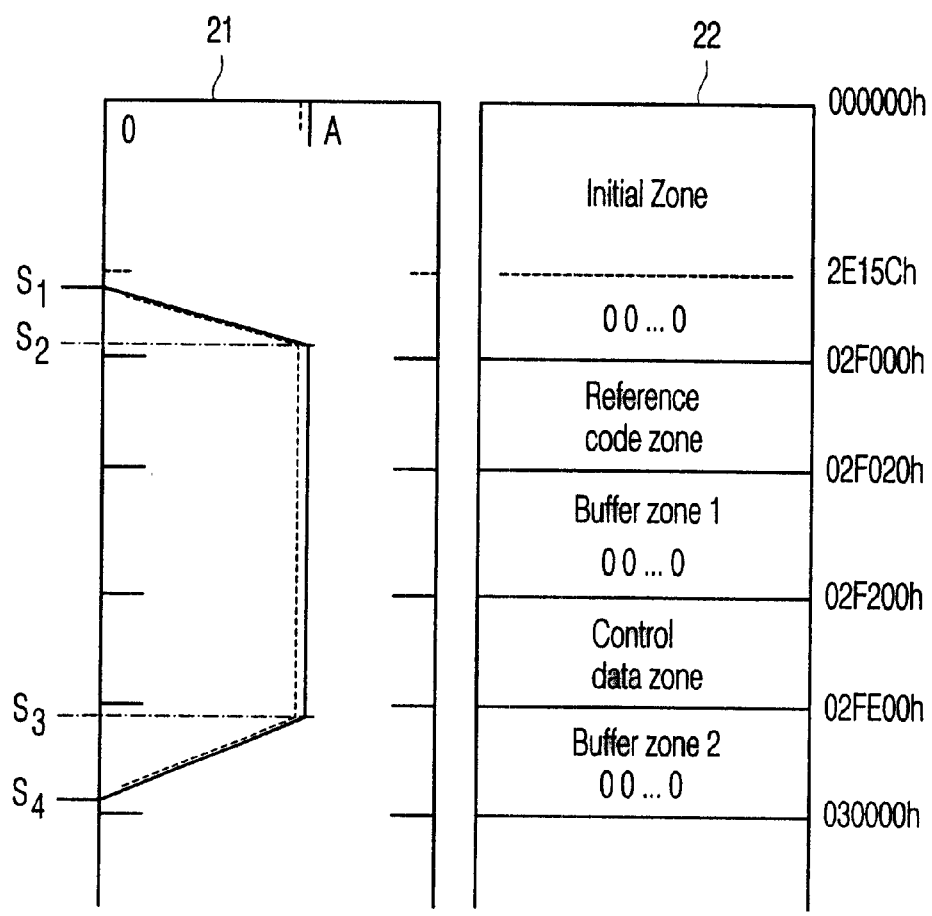
FIG. 2 shows a schematic map of the recorded area and the wobble amplitude.

Corresponding elements in different Figures have identical reference numerals.

FIG. 1a shows a disc-shaped record carrier 1 having a track 9 and a central hole 10. The track 9 is arranged in accordance with a spiral pattern of turns constituting substantially parallel tracks on an information layer. The record carrier may be an optical disc having an information layer of a recordable type or of a prerecorded type. Examples of a recordable disc are the CD-R and CD-RW, and the DVD+RW, whereas the audio CD or the DVD video are examples of prerecorded discs. The prerecorded type can be manufactured in a well known way by first recording a master disc and via intermediate steps subsequently pressing consumer discs. The track 9 on the recordable type of record carrier is indicated by a pre-embossed track structure provided during manufacture of the blank record carrier, for example, a pregroove. The information is represented on the information layer by optically detectable marks recorded along the track. The marks are constituted by variations of a first physical parameter and thereby have different optical properties or magnetic direction than their surroundings, e.g. variations in height called pits and lands on a CD.

FIG. 1b is a cross-section taken along the line b—b of the record carrier 1 of the recordable type, in which a transparent substrate 5 is provided with a recording layer 6 and a protective layer 7. The track structure is constituted, for example, by a pregroove track 4 which enables a read/write head to follow the track 9 during scanning. The pregroove track 4 may be implemented as an indentation or an elevation, or may consist of a material having a different optical property than the surrounding material. The pregroove track enables a read/write head to follow the track 9 during scanning. A track structure may also be formed by regularly spread servo marks which periodically cause servo signals to occur. The record carrier may carry real-time information, for example, video or audio information, or other information, such as computer data.

The FIGS. 1c and 1d show two examples of a variations of the track. FIG. 1c shows a periodic variation of the lateral position of the track 4, also called wobble. FIG. 1d shows a variation of the width of the track 4. The variations cause an additional signal to arise in the read head, e.g. in a servo tracking detector, of a recorder. The wobble is, for example, frequency modulated and disc information is encoded in the modulation. A comprehensive description of a writable CD system having disc information encoded in such a manner can be found in U.S. Pat. No. 4,901,300 (PHN 12.398) and U.S. Pat. No. 5,187,699 (PHQ 88.002). For the read-only type of optical record carriers the track 4 as schematically drawn in FIG. 1c is constituted by a series of pits, and the wobble of the track in that case is the periodic variation of the lateral position of the pits.

According, to the invention the wobble includes a code, which is an identifier to support copy-control, anti-piracy and/or other mechanisms. The code contains data for copy protection and anti-piracy mechanisms. It is to be noted, that in a recordable disk the pregroove or track structure is wobbled, whereas in a pre-recorded record carrier the detectable marks are wobbled, e.g. a wobble of the pits. During the mastering process, the wobble is written by a laser beam recorder, by imposing a small lateral offset of the center of the pits. The wobble is detectable by the optical pick-up, using the servo control signals.

FIG. 2 shows a schematic map of the recorded area and the wobble amplitude. The schematic map 21 shows the first part of the recorded area and indicates the amplitude A of the wobble. A corresponding address map 22 is shown alongside. The wobble is located only in a limited area of the total recorded area, e.g. at an area within the lead-in area of a disc as indicated in FIG. 2 from S1 to S4. Preferably, the limited area does not include essential information, e.g. zero or redundant data. In a DVD type disc the wobble is provided at specific addresses at the end of the Initial Zone of the Lead-in area, between sector S1, which is larger than or equal to 0x02E15C and sector S4, which is smaller than or equal to 0x02FF7C.

It is to be noted, that if the wobble amplitude is nominal in one track and zero in the neighboring track, that in such boundary tracks the crosstalk is not compensated as described in the introduction. Hence, in such tracks, an increased noise level is found. In an embodiment of the record carrier the wobble amplitude in boundary areas (in FIG. 2: S1 to S2 and S3 to S4) shall depend on the radial position, so as to gradually increase from zero to the nominal amplitude and vice versa. The center area including the nominal amplitude (from S2 to S3) can be used for detecting and retrieving the code, whereas in the boundary areas, the disturbance caused by the wobble decreases to zero, but does not substantially exceed the level in the limited area. In a practical embodiment, the wobble amplitude depends on the address of the sector number as follows. The maximum amplitude is A=30 nm. It shall take on its full amplitude A (only) between sector S2, with S1+0x100<S2<0x02f000, and S3 with 0x02FE00<S3<S4−0x100. This implies that the range where the full amplitude is applied (S3–S2), shall at least cover a reference code zone, buffer zone 1 and the control data zone. The ramp-up and ramp-down of the wobble amplitude takes at least 256 sectors (roughly 16 windings). The amplitude shall be zero for sector numbers below S1 and beyond S4. It linearly increases with sector number from zero to A between S1 and S2. It shall have a constant value of A between sector S2 and S3. It linearly decreases from A to zero between r3 and r4. In practical embodiments, it is permissible that the wobble amplitude increases stepwise per sector number, step wise per disc winding or continuously. Preferably, jumps in wobble amplitude shall not exceed 3 nm, and any point on two successive windings, the amplitude difference shall not exceed 3 nm. In practice on a CD type disc, the wobble location corresponds to radii of 23 to 24 mm. In an embodiment, the wobble has the form of a sinusoidal offset (relative to the center of the track) of the position of the pits which encode the information. The wobble is written with constant angular velocity (CAV), and every track is modulated with the same code and additional control bits. Hence, every winding of the disc contains the same wobble waveform, except possibly, for a minute difference in amplitude or phase error. In a practical embodiment the number of wobble sinusoids per track is 1152. The phase offset between two neighboring tracks is as small as possible. In practice for a sufficient quality read signal the phase difference may not exceed 30 degrees, where 360 degrees corresponds to one full wobble sinusoid ($1/1152$th of a disc winding).

The code which is encoded in the wobble may be used as a disc mark. The disc mastering set-up should accept a disc mark seed (e.g. a 64 bit number), from which it creates the wobble code, preferably, using a cryptographic function. For security reasons, no facilities are allowed to directly insert the wobble code. A cryptographic relation can be used between the wobble code and the recorded information on the record carrier, for example, a one-way function between the disc mark and a watermark, i.e. embedded control information in the audio and/or video information. Further details of the creation and use of a disc mark and verification of the disc mark against additional control information (e.g. a so called control ticket) by a controllable type of data processing can be found in WO98/33176 and WO 98/33325. In an embodiment, the record carrier contains several annular areas with wobbled tracks separated by transit areas. Each area may have a different modulation pattern, whereas the modulation pattern within each individual area is the same. Hence, a number of codes may be encoded in the second variations. The transit areas may have no wobble or have a transit pattern gradually changing the modulation pattern from a first annular area into the modulation pattern of a second annular area.

In an embodiment, the code is provided with error correction symbols for correcting read errors. For error correction a Reed-Solomon [8,4,5] code over $F_{2^4}$ with rate $R=\frac{1}{2}$ may be used. The 64 bits from the cryptographic function are grouped into 4 times 4 symbols. One symbol contains 4 bits. The Reed Solomon encoder operates on 4 symbols at a time. Four user symbols $x_1$, $x_2$, $x_3$, $x_4$ are expanded to $x_4$, $x_3$, $x_2$, $x_1$, 0, 0, 0, 0, 0, 0, 0 (of length 11). Four ECC symbols $x_{12}$, $x_{13}$, $x_{14}$, $x_{15}$ are obtained using polynomial $x^4+x+1$. The output of the error correction encoder are the 8 symbols $x_1$, $x_2$, $x_3$, $x_4$, $x_{12}$, $x_{13}$, $x_{14}$, $x_{15}$.

FIG. 3 shows parts of a modulation pattern. The code is represented by data bits, which are converted to a waveform and encoded in the wobble, and are provided with synchronization words for locating the start of the code.

Figure 3A:
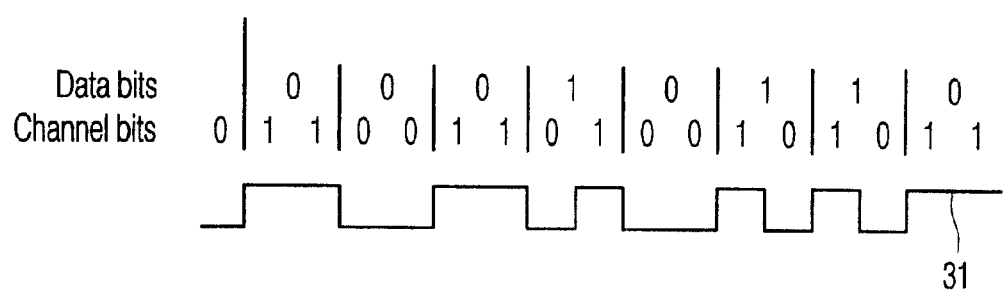
FIG. 3 shows parts of a modulation pattern.

FIG. 3a shows an example of modulation of data bits to channel bits, and the corresponding waveform 31. Data bits are Biphase-Mark coded. In the Biphase-Mark code, two channel bits represent one data bit. The code always has a "0"-to-"1" or a "1"-to-"0" transition at the beginning of a data bit. A second transition shall occur in the middle of the data bit in case it has value "1". In addition to data bits, code synchronization words are added for detecting the start of the code. Every group of 4 data symbols shall be preceded by a specific 8 (channel) bit sync word.

Figures 3B, 3C:
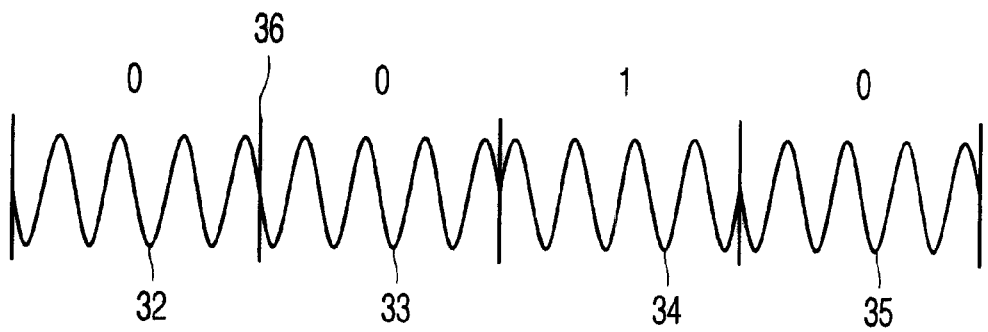

FIG. 3b shows a modulated wobble. The modulation is called binary Phase Shift Keying (PSK). A channel bit contains 4 periods of the wobble sinusoid. Bit transitions 36 occur only at zero crossings of the wobble sinusoids. A first channel bit 32 has value 0, a second channel bit is also 0, a third channel bit 34 is 1 and the fourth channel bit 35 is 0. Due to the Biphase-Mark coding, a data-bit is 8 carrier periods, and FIG. 3b shows two data bits. Due to the $R=\frac{1}{2}$ error-correction, the effective bit period is 16 wobble carrier periods. For detecting, it is permissible that the read signal of the modulated wobble is band-pass or high-pass filtered, provided that the band-pass characteristic remains substantially flat, e.g. within 3 dB.

FIG. 3c specifies four different synchronization words. The synchronization words violate the above Biphase-Mark code rule, so that, they can be easily recognized. A sync word always starts with a phase reversal. A sync-word has two possible appearances that are each other's (channel-bit) inverse. Which appearance is used depends on the last bit of previous channel bits.

Figure 3D:
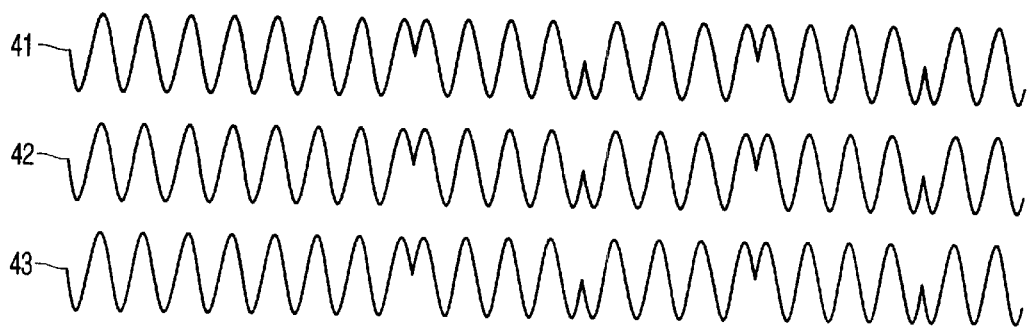
Figure 3E:
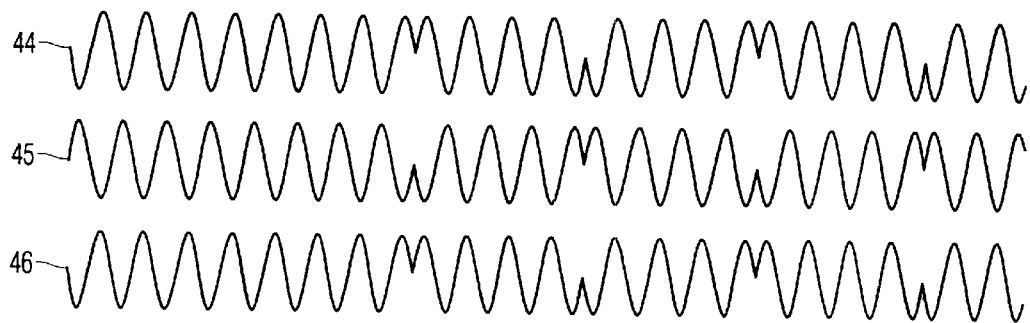

FIGS. 3d and 3e show aligned modulation patterns. These Figures give a detail of a few neighboring tracks, and a modulation pattern of transversal excursion, which is not drawn to scale (in reality the excursion is 3% to 10% of the track pitch). According to the invention, the modulation patterns are aligned from track to track, i.e. for this type of modulation the zero crossings are at a corresponding longitudinal position. In the Figures, the middle track 42, 45 is a code track including the modulated pattern representing the code, which is to be read from left to right as indicated by arrow 40. In FIG. 3d, the left neighboring track 41 and the right neighboring track 43 have the same modulation pattern as the code track 42. In an embodiment shown in FIG. 3e, the modulation pattern in the left neighboring track 44 is inverse to the modulation pattern in the code track 45. Right neighboring track 46 again has the polarity of left neighboring track 44. Hence, the modulation is inverted from track to track. In a further embodiment using track width modulation as shown in FIG. 1d, the modulation of the left neighboring track is inverse to the modulation of the right neighboring track for achieving the optimum crosstalk compensation. In this case, a maximum width of the left neighboring track is aligned with a minimum width of the right neighboring track. As such, a pattern is formed of each time two equal modulated tracks followed by two inverse modulated tracks.

Figure 4:
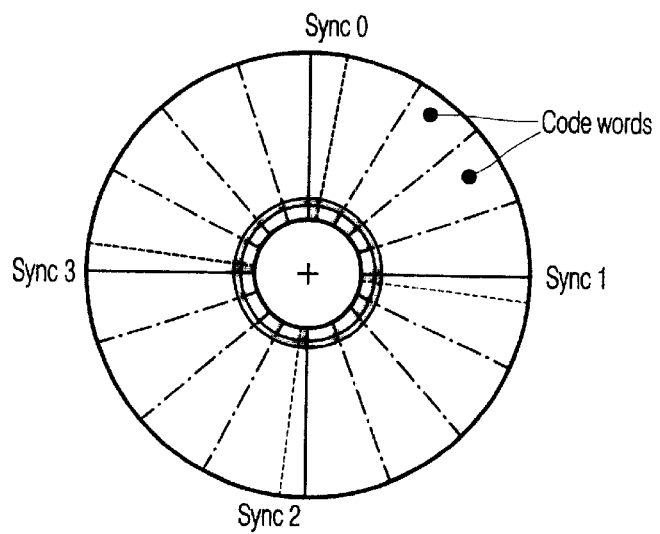
FIG. 4 shows a record carrier layout.

FIG. 4 shows a layout of a record carrier. One winding of the track is encoded with four segments of code words, alternating with sync words. The winding starts with Sync word 0, followed by 64 channel bits, followed by Sync 1, 64 channel bits, Sync 2, 64 channel bits, Sync 3, and 64 channel bits. The next winding contains precisely the same code. The absence of a wobble phase reversal between data bits is permissible between the end of any winding and the start of the next winding, although this violates the bi-phase mark modulation. Hence, the same modulation pattern is present in every wobbled track. In an embodiment of the record carrier, the polarity of the modulation is inverse from track to track, as shown in FIG. 3e. This improves the read signal strength for wobble detection in certain track configurations, e.g. detection of servo signals by push-pull detectors used in CD Recordable systems. In a practical embodiment of the record carrier, the tracks contain 64 code bits for wobble key plus 64 bits for ECC, and (4*8)/2 synchronization bits. In total, one winding of the track contains precisely 4* [2* (64+64)÷4*8]=1152 wobble periods. When the disc rotates at approximately 25 Hz for reading lead-in area, the wobble frequency $f_w$=1152*25 Hz=28.8 kHz. Such a wobble frequency of about 30 kHz has the advantage, that the information encoded in the track by the first variations, has substantially no frequency components in this range, and is also outside the bandwidth of the tracking servo system. Hence, the detection of the modulation pattern is not disturbed by the first variations.

Figure 5:
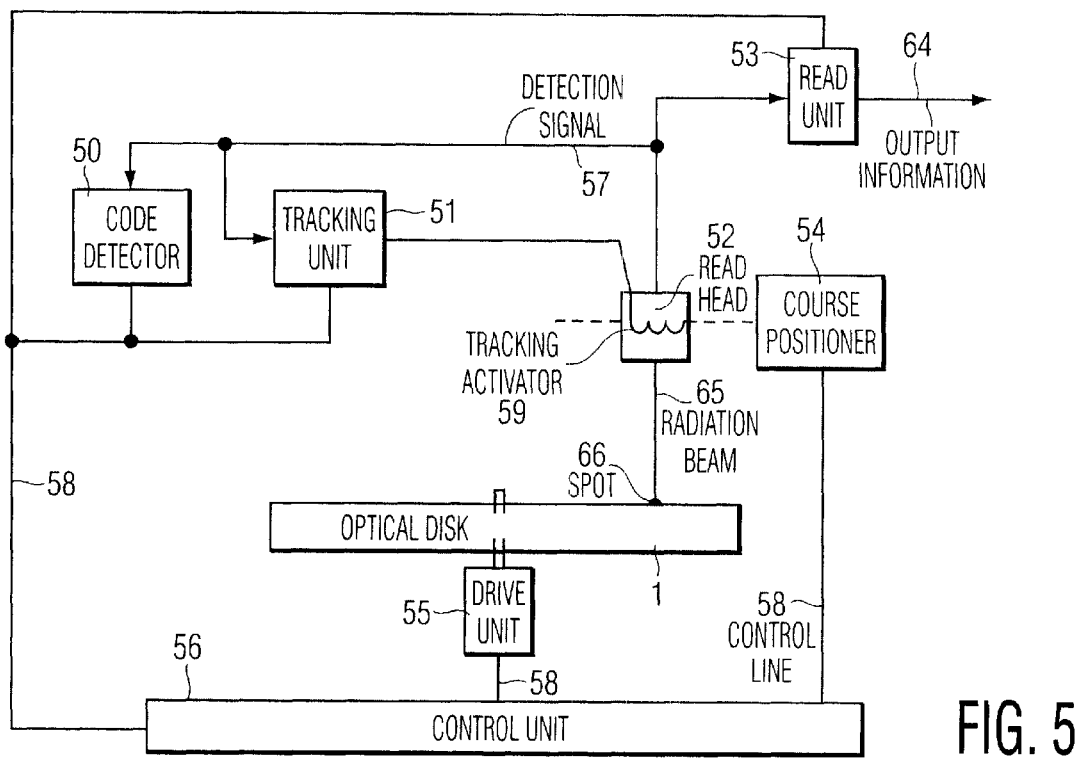
FIG. 5 shows a playback device.
Figure 6:
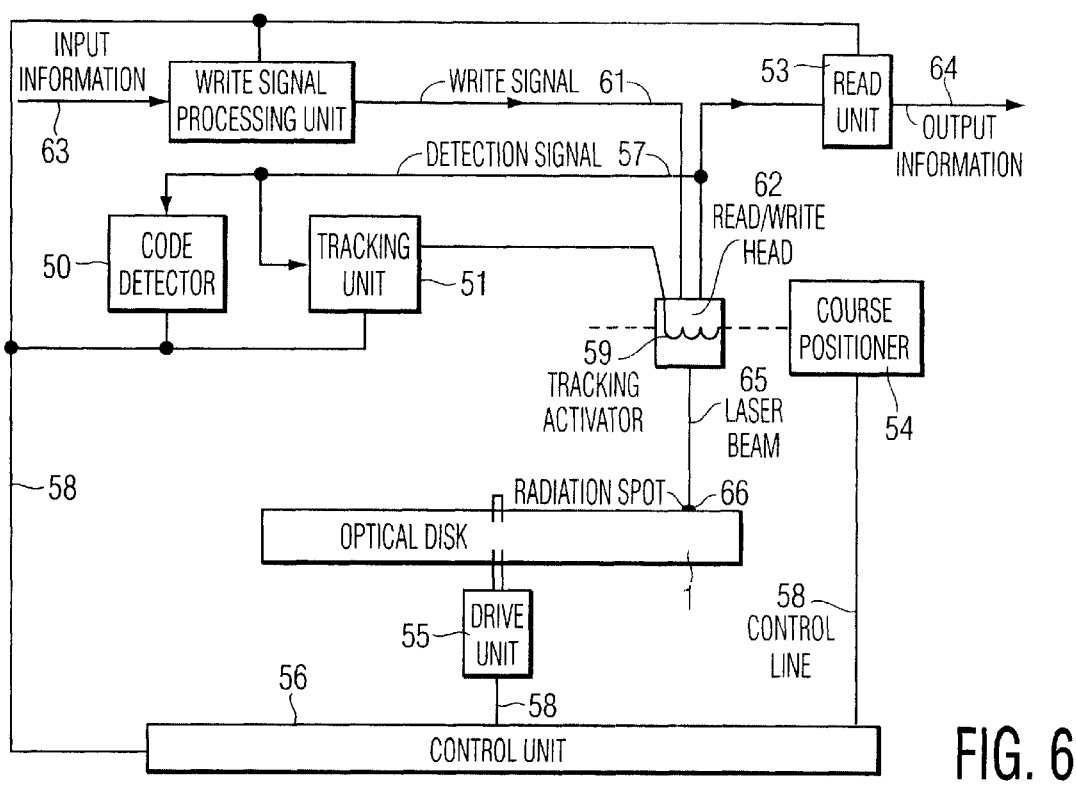
FIG. 6 shows a recording device

FIGS. 5 and 6 show apparatuses according to the invention for scanning a record carrier 1. The apparatus of FIG. 5 is arranged for reading the record carrier 1, which record carrier is identical to the record carriers shown in FIG. 1. The device is provided with read apparatus including a read head 52 for scanning the track on the record carrier, a drive unit 55 for rotating the record carrier 1, a reading unit 53, for example, including a channel decoder and an error corrector, a tracking unit 51 and a system control unit 56. The read head includes an optical system of a known type for generating a radiation spot 66 focused on a track of the recording layer of the record carrier via a radiation beam 65 guided through optical elements. The radiation beam 65 is generated by a radiation source, e.g. a laser diode. The read head further includes a focusing actuator for focusing the radiation beam 65 on the recording layer and a tracking actuator 59 for fine positioning of the spot 66 in radial direction on the center of the track. The tracking actuator 59 may include coils for radially moving an optical element or may be arranged for changing the angle of a reflecting element on a movable part of the read head or on a part on a fixed position in the case part of the optical system is mounted on a fixed position. The radiation reflected by the recording layer is detected by a detector of a usual type, e.g. a four-quadrant diode, for generating a detector signals 57 including a read signal, a tracking error and a focusing error signal. The apparatus is provided with a tracking unit 51 coupled to the read head for receiving the tracking error signal from the read head and controlling the tracking actuator 59. The tracking unit may, for example, be of the differential phase detection (DPD) type, in which the deviation of the read head in relation to the centerline of the track is detected from phase differences which occur between signals from subdetectors when scanning a mark (e.g. a pit) in the track. Alternatively, the tracking unit may be of the well known push-pull type, in which the deviation is detected based on detector signals from the left and rights side of the track. During reading, the read signal is converted into output information, indicated by arrow 64, in the reading unit 53. For this purpose, the reading unit 53 includes data processing of a controllable type, which are to be controlled based on a code from the record carrier, for example, access control may be performed based on the code retrieved from the record carrier. The apparatus has positioning apparatus 54 for coarsely positioning the read head 52 in the radial direction on the track, the fine positioning being performed by the tracking actuator 59. The apparatus is provided with a code detector 50 for detecting and demodulating the code from the detector signals 57 when scanning a code track that includes the modulation pattern. For example, the track may be modulated by periodic excursions transverse to the longitudinal track direction as described above with reference to FIG. 3. Such modulation can be detected from the radial tracking servo signals. The device is further provided with a control unit 56 for receiving commands from a controlling computer system or from a user and for controlling the apparatus via control lines 58, e.g. a system bus connected to the drive unit 55, the positioning apparatus 54, the code detector 50, the tracking unit 51, and the reading unit 53. To this end, the control unit includes control circuitry, for example, a microprocessor, a program memory and control gates, for performing the procedures described below. The control unit 56 may also be implemented as a state machine in logic circuits. The control unit 56 is arranged for retrieving the code from the track via the code detector 50, and for controlling the type of data processing in the reading unit 53. For example, the code may be a de-scramble key, which is used for decrypting copy protected video information. For reliable detection of the code, the control unit 56 is arranged for detecting the code from at least two tracks. A first code track is located by positioning the read head at a predetermined track, e.g. at a predetermined radial position or a predetermined address. Then the code is detected from the first code track. For verifying the detected code a second code track is scanned, e.g. the next winding of the track. The second detected code is compared with the first code, and if equal, the code is passed on to the data processing unit. In an embodiment of the system the code may be provided with error detection symbols, and the control unit may decide to read the code from a different code track only if errors are indicated by the error symbols. Alternatively, the control unit may be arranged for reading two tracks which are at different radial positions and comparing the retrieved codes. In the event that the retrieved codes are not equal, further tracks are read and the retrieved codes (or the read signals) are kept in memory until the code can be determined with a sufficient certainty, e.g. at least 4 out of 5 tracks had the same code. An embodiment the read device includes apparatus for locating a modulated area, i.e. a limited area of the record carrier that includes modulated tracks as described above with reference to FIG. 2. The device may have a memory containing predetermined modulated area address information for locating the modulated area. Alternatively, such address information may be provided on the record carrier, for example, in a system information area. The control unit 56 is arranged for controlling the positioning apparatus 54 and the tracking actuator 59 for accessing a code track in the modulated area of the record carrier as indicated by the modulated area address information.

FIG. 6 shows a device for writing information on a record carrier according to the invention of a type which is (re) writable in, for example, a magneto-optical or optical manner (via phase change or dye) by means of a beam 65 of electromagnetic radiation. The device is usually also equipped for reading and includes the same elements as the apparatus for reading described above with FIG. 5, except that it includes a write apparatus which include a write/read head 62 and a write signal processing unit 60, which includes, for example, a formatter, an error encoder and a channel encoder. The write/read head 62 has the same function as the read head 52 together with a write function and is coupled to the write signal processing unit 60. The information presented to the input of the write signal processing unit 60 (indicated by the arrow 63) is distributed over logical and physical sectors according to formatting and encoding rules and converted into a write signal 61 for the write/read head 62. The system control unit 56 is arranged for controlling the write signal processing unit 60 and for performing the position information recovery and positioning procedure as described above for the reading apparatus. During the writing operation, marks representing the information are formed on the record carrier. Writing and reading of information for recording on optical discs and usable formatting, error correcting and channel coding rules, are well-known in the art, e.g. from the CD system. In particular, the code detecting apparatus 50 are arranged for retrieving the code from the modulated tracks as described with the read apparatus. A data clock is used to control the write signal processing unit 60 and/or the reading unit 53. Data clock generation apparatus can be controlled by the system control unit 56 based on the radial position, e.g. on a zone and the rotation rate of the disc, and/or may be locked to the wobble.

A recording method for providing a blank record carrier with modulated tracks includes the following steps. In the method, the record carrier is provided with substantially parallel tracks, and the information is encoded in first variations of a first physical parameter of the track, which information is recoverable by means of a controllable type of data processing; and a code for controlling the type of data processing is encoded in a modulation pattern of second variations of a second physical parameter of the track. With respect to a code track that includes the modulation pattern, the modulation pattern in the left neighboring track is aligned to the modulation pattern in the right neighboring track. This may be achieved by accurately controlling the modulation of the second variations, e.g. the radial positioning of the track in relation to the rotational position of a disc-shaped record carrier. Alternatively, a second read head may be used to read the modulation pattern at a position two tracks before the track being written. In an embodiment, the record carrier is rotated and the modulation is controlled depending on the rotational position. Such control is achieved by using tachopulses from a motor that rotates the record carrier, and locking a waveform generator to the tachopulses. The waveform generator further includes the code for modulating the second variations during writing.

Although the invention has been explained mainly by embodiments using the wobble (a variably modulated transverse excursion), any suitable modulation of a parameter of the track may be modulated, e.g. the average reflection of a written part or the shape of certain pits. Also for the information carrier an optical disc has been described, but other media, such as a magnetic disc or tape, may be used. Further, the invention lies in each and every novel feature or combination of features described above.

What is claimed is:

1. A record carrier comprising:
   a substrate; and
   substantially parallel tracks on the substrate and exhibiting:
   first variations of a first physical parameter of the track, the first variations representing information recorded on the record carrier, which information is recoverable by means of a controllable type of data processing; and
   second variations of a second physical parameter of the track, a modulation pattern of the second variations representing a code for controlling the type of data processing, a code track that has the modulation pattern has a left neighboring track and a right neighboring track, each track having a respective physical parameter, the modulation pattern in the left neighboring track is aligned with the modulation pattern in the right neighboring track and the alignment between the modulation of the right and left neighboring tracks substantially reduces the crosstalk between the code track and the neighboring tracks.

2. The record carrier of claim 1, wherein the second variations are displacements of the track in a direction transverse to the longitudinal direction of the track, and displacements of the left neighboring track coincide with displacements of the right neighboring track in the same direction.

3. The record carrier of claim 1, wherein the modulation pattern in the code track is substantially inverse to the modulation pattern in the left neighboring track.

4. The record carrier of claim 1, wherein the second variations are periodic and the modulation pattern include phase modulation, and phase differences between modulation patterns in adjacent tracks are limited to a predetermined amount.

5. The record carrier of claim 1, wherein the tracks constitute a spiral or concentric pattern of tracks, and adjacent tracks in the pattern of tracks exhibit a same number of the second variations.

6. The record carrier of claim 1, wherein only tracks in a limited area of the record carrier exhibit the second variations.

7. The record carrier of claim 6, wherein the limited area includes a boundary zone between an area not exhibiting second variations and a center area exhibiting the second variations at a predetermined amplitude, in which boundary zone the amplitude of the second variations increases from zero to the predetermined amplitude.

8. The record carrier of claim 1, wherein the modulation patterns in the code track and the neighboring tracks represent the same code.

9. The record carrier of claim 1 in which the neighboring tracks are written on a pregroove.

10. The record carrier of claim 1 in which each track has two boundaries, the boundaries, of the code track being separated from the boundaries of the left and right neighboring tracks.

11. The record carrier of claim 1 in which the track has two boundaries, the second variations are displacements of the boundaries in a radial direction of the disk, in the same or in mutually opposite directions.

12. The record carrier of claim 1, wherein:
   the second variations include displacements of the track in a direction transverse to the longitudinal direction of the track, and displacements of the left neighboring track coincide with displacements of the right neighboring track in the same direction;
   the modulation patterns in the code track and the neighboring tracks represent the same code;
   the modulation pattern in the code track includes modulations that are substantially inverse to the modulation pattern in the left neighboring track;
   the second variations are periodic and the modulation pattern includes phase modulation, and phase differences between modulation patterns in adjacent tracks are limited to a predetermined amount;
   the tracks constitute a spiral or concentric pattern of tracks, and adjacent tracks in the pattern of tracks exhibit a same number of the second variations;
   only tracks in a limited area of the record carrier exhibit the second variations; and
   the limited area includes a boundary zone between an area not exhibiting second variations and a center area exhibiting the second variations at a predetermined amplitude, in which boundary zone the amplitude of the second variations increases from zero to the predetermined amplitude;
   the neighboring tracks are written on a pregroove;
   each track has two boundaries, the boundaries of the code track being separated from the boundaries of the left and right neighboring tracks;
   the code track has two boundaries, the second variations include displacements of the boundaries in a radial direction of the disk, in the same or in mutually opposite directions.

13. A method comprising the steps of:
   providing a record carrier with substantially parallel tracks;
   encoding in first variations of a first physical parameter of the track information that is recoverable using a controllable type of data processing; and
   encoding in a modulation pattern of second variations of a second physical parameter of the track, a code for controlling the type of data processing, a code track that has the modulation pattern has a left and right neighboring tracks, each track having a respective second physical parameter, the modulation pattern in the left neighboring track is aligned to the modulation pattern in the right neighboring track, and the alignment between the modulations of the left and right neighboring tracks substantially reduces crosstalk between the code track and the neighboring tracks.

14. The method of claim 13, wherein the record carrier is rotated and the modulation pattern is generated depending on the rotation.

15. The method of claim 13, wherein:
- the second variations include displacements of the track in a direction transverse to the longitudinal direction of the track, and displacements of the left neighboring track coincide with displacements of the right neighboring track in the same direction;
- the modulation patterns in the code track and the neighboring tracks represent the same code;
- the modulation pattern in the code track includes modulations that are substantially inverse to the modulation pattern in the left neighboring track;
- the second variations are periodic and the modulation pattern includes phase modulation, and phase differences between modulation patterns in adjacent tracks are limited to a predetermined amount;
- the tracks constitute a spiral or concentric pattern of tracks, and adjacent tracks in the pattern of tracks exhibit a same number of the second variations;
- only tracks in a limited area of the record carrier exhibit the second variations; and
- the limited area includes a boundary zone between an area not exhibiting second variations and a center area exhibiting the second variations at a predetermined amplitude, in which boundary zone the amplitude of the second variations increases from zero to the predetermined amplitude;
- the neighboring tracks are written on a pregroove;
- each track has two boundaries, the boundaries of the code track being separated from the boundaries of the left and right neighboring tracks;
- the code track has two boundaries, the second variations include displacements of the boundaries in a radial direction of the disk, in the same or in mutually opposite directions.

16. A recording device for recording information on a record carrier, comprising:
- encoding in first variations of a first physical parameter of a track on the record carrier, information that is recoverable using a controllable type of data processing; and
- encoding in a modulation pattern of second variations of a second physical parameter of the track, a code for controlling the type of data processing, a code track that has the modulation pattern has a left and right neighboring tracks, each track having a respective second physical parameter, the modulation pattern in the left neighboring track is aligned to the modulation pattern in the right neighboring track, and the alignment between the modulations of the left and right neighboring tracks substantially reduces crosstalk between the code track and the neighboring tracks when the code is read out.

17. The recording device of claim 16, wherein:
- the second variations include displacements of the track in a direction transverse to the longitudinal direction of the track, and displacements of the left neighboring track coincide with displacements of the right neighboring track in the same direction;
- the modulation patterns in the code track and the neighboring tracks represent the same code;
- the modulation pattern in the code track includes modulations that are substantially inverse to the modulation pattern in the left neighboring track;
- the second variations are periodic and the modulation pattern includes phase modulation, and phase differences between modulation patterns in adjacent tracks are limited to a predetermined amount;
- the tracks constitute a spiral or concentric pattern of tracks, and adjacent tracks in the pattern of tracks exhibit a same number of the second variations;
- only tracks in a limited area of the record carrier exhibit the second variations; and
- the limited area includes a boundary zone between an area not exhibiting second variations and a center area exhibiting the second variations at a predetermined amplitude, in which boundary zone the amplitude of the second variations increases from zero to the predetermined amplitude;
- the neighboring tracks are written on a pregroove;
- each track has two boundaries, the boundaries of the code track being separated from the boundaries of the left and right neighboring tracks;
- the code track has two boundaries, the second variations include displacements of the boundaries in a radial direction of the disk, in the same or in mutually opposite directions.

* * * * *